United States Patent [19]

Stiévenart et al.

[11] 4,011,570
[45] Mar. 8, 1977

[54] PHOTOGRAPHIC CAMERA

[75] Inventors: Emile Frans Stiévenart, Hoboken; Hugo Frans Deconinck, Deurne-Zuid, both of Belgium

[73] Assignee: AGFA-GEVAERT N.V., Mortsel, Belgium

[22] Filed: Dec. 2, 1975

[21] Appl. No.: 636,842

[30] Foreign Application Priority Data

Dec. 4, 1974 United Kingdom ............ 52504/74

[52] U.S. Cl. .................................... 354/89; 354/109
[51] Int. Cl.² .................. G03B 17/24; G03B 17/50
[58] Field of Search .................. 355/74, 77; 354/83, 354/89, 90, 92, 84, 291, 106, 108, 109, 110, 211

[56] References Cited

UNITED STATES PATENTS

| | | | |
|---|---|---|---|
| 1,933,953 | 11/1933 | Ames | 354/109 X |
| 2,218,656 | 10/1940 | Pifer | 354/83 X |
| 2,524,941 | 10/1950 | Taylor | 354/108 X |
| 2,827,832 | 3/1958 | Patterson et al. | 354/106 X |
| 3,097,584 | 7/1963 | Wright | 354/83 |
| 3,610,120 | 10/1971 | Morse et al. | 354/109 |
| 3,726,192 | 4/1973 | Dalton | 354/106 |
| 3,783,763 | 1/1974 | Whitley et al. | 354/108 |
| 3,928,863 | 12/1975 | Stewart et al. | 354/109 |

FOREIGN PATENTS OR APPLICATIONS 149,676  9/1962  U.S.S.R. .............................. 354/83

*Primary Examiner*—Donald A. Griffin
*Attorney, Agent, or Firm*—William J. Daniel

[57]  ABSTRACT

A photographic camera for printing two different kinds of data upon one sole image carrier comprises a pre-exposure station in which a mask is printed upon the image carrier. After such pre-exposure the image carrier is moved into the focal plane of two optical systems. The first of said systems projects an image of data located inside the camera (such as data printed or typewritten on a card) on a primarily unexposed area of the image carrier, whereas the second optical system projects an image of data located outside the camera (such as the image of a person) on another primarily unexposed area of the image carrier. The image carrier is subsequently developed in a processing station which itself may also be provided in the camera. Photographic materials of the diffusion transfer reversal type are used advantageously in combination with the camera.

14 Claims, 6 Drawing Figures

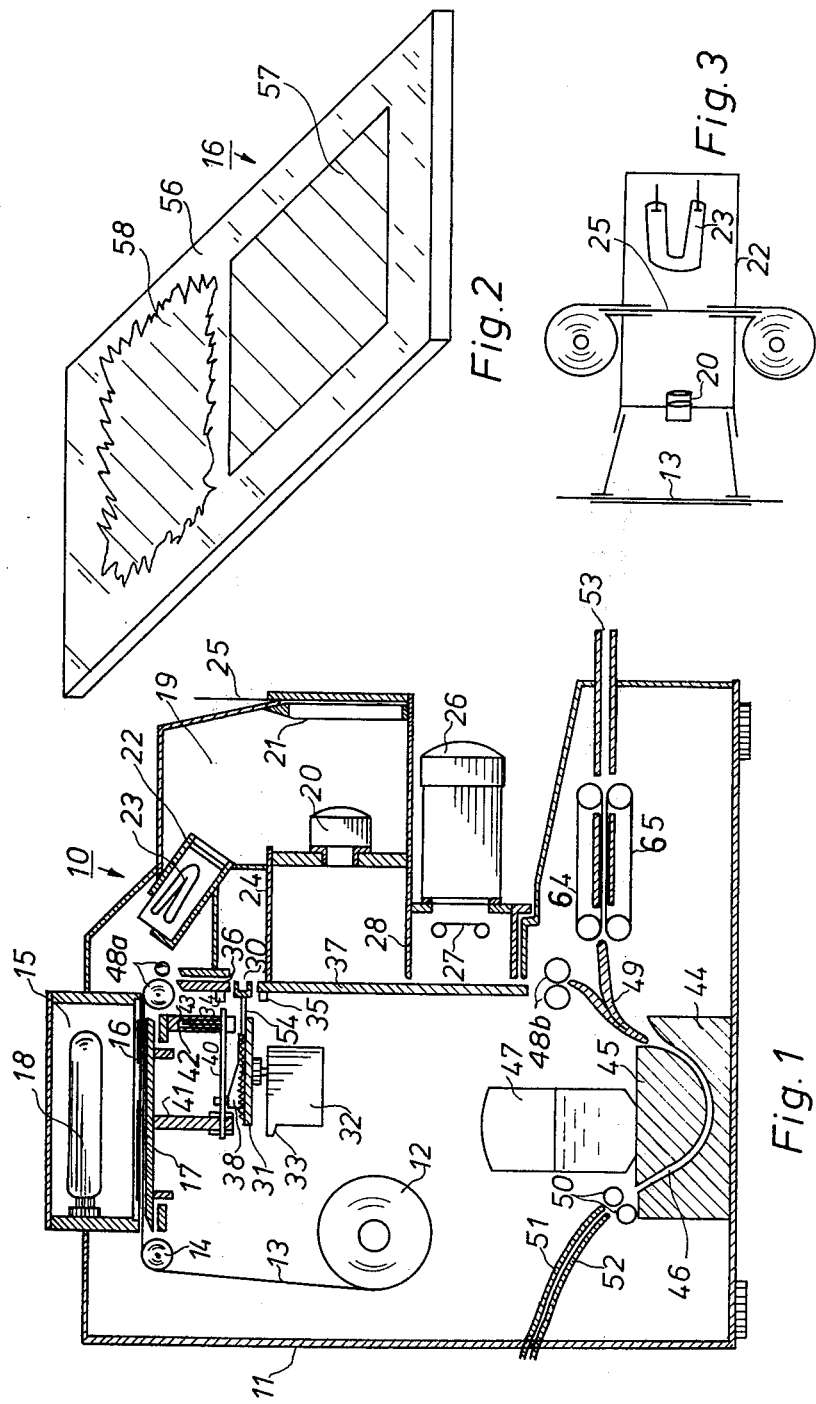

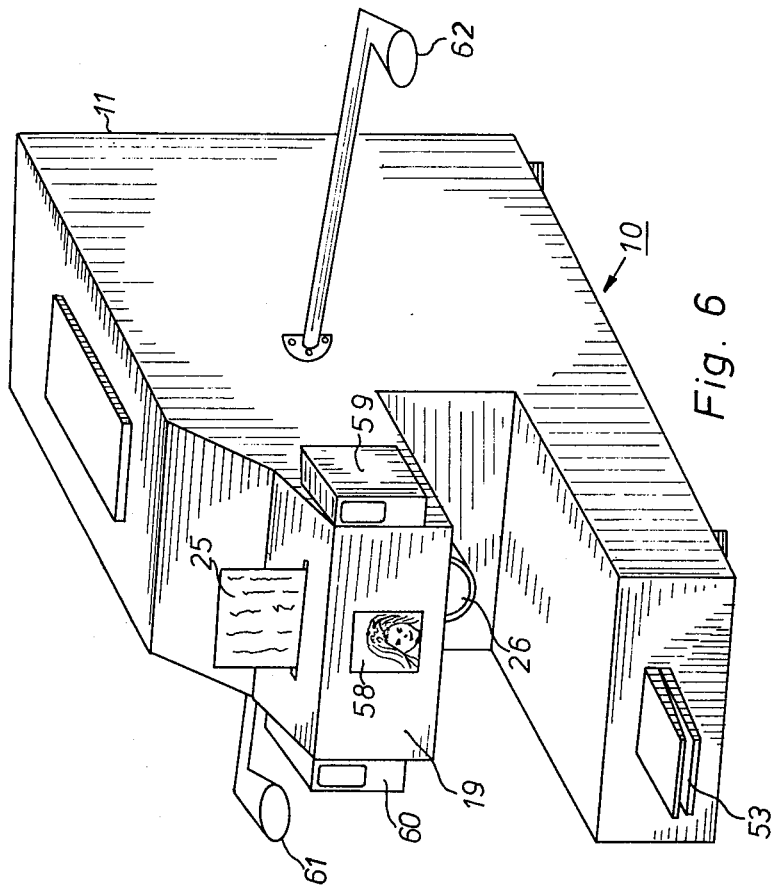
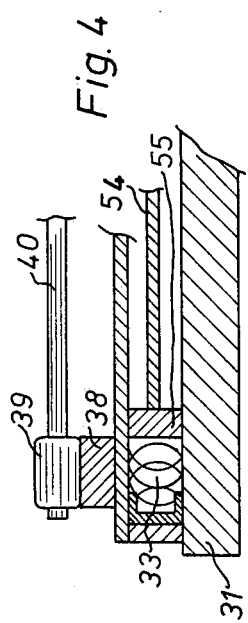
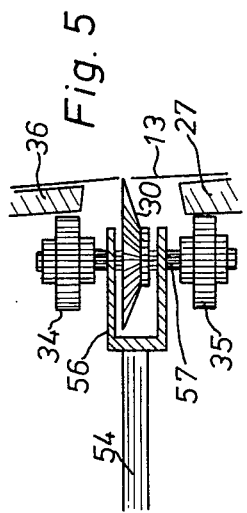
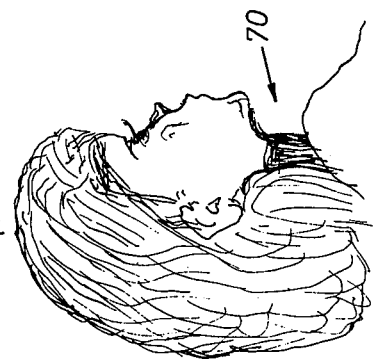

PHOTOGRAPHIC CAMERA

This invention relates to photographic cameras, and more particularly to photographic cameras by means of which more than one image may be projected onto a recording material.

Photographic cameras having this property are advantageously used for producing documents wherein at least two kinds of information are to be recorded onto one sole support, for example a photograph of a person and data relating to said person. Typical examples of such documents are drivers licences, bank cheques, identity cards, etc.

A major problem which arises and which heretofore might have been the cause that no break-through of such cameras has occurred, lies in the fact that photographs obtained by such cameras may be liable to falsifications, that is to say, that it was relatively easy to substitute an other image for either the original record of a person's image or that of the concerned data.

Successful attempts have been made in order to render falsifications difficult or even impossible. A camera which is capable of recording two or more images without a risk that substitution may be carried out without a fair chance of detection of the falsification is described in the German Offenlegungsschrift 2,110,146 filed Mar. 3, 1971 by Kodak Ltd. It makes use of a double optical system, wherein each system is partly covered by a mask of a definite geometrical shape, and in which both masks are of such form and dimensions that the extent of their surfaces covers the net area of the photograph. Due to the fact that the masks are placed at a certain distance from the optical system, the image projected onto the recording material has unsharp edges or edges which gradually fade-out, a phenomenon known under the name of "vignetting". Images having such edges are difficult to falsify as the slightest attempt to modify the image obtained will be noticed, even by an unskilled person. However the necessary special optical arrangements involves additional costs in the manufacture of such cameras.

The present invention enables a camera for recording at least two images onto one photographic material to be provided which does not have to possess special optical systems.

A secondary object of the invention is to provide a photographic camera by means of which vignetting may be obtained without special optical arrangements.

A third object of the invention is the provision of a photographic camera which delivers photographs which are not liable to falsifications, even in the absence of vignetting.

Another object is to provide a camera of the above type which has a built-in processing station.

According to the present invention there is provided a photographic camera for exposing a photographic light-sensitive material simultaneously to different subjects to form images thereof at different places on such material; said camera incorporating at least first and second exposure stations at which the said material can be sequentially exposed and means for transporting a photographic material within the camera through said first and second exposure stations; said first station incorporating masking means adapted to shield at least two areas of the material from exposure to light at that station, and said second station having optical projection means for projecting an image of one subject onto one of said areas, and an image of at least one other subject onto one other of such areas of the photographic element.

The camera may be designed for loading with separate sheets of photographic material. Preferably however the camera is designed for loading with a roll of photographic material and the said transporting means serves to transport successive lengths of the roll to said first and then to said second station.

Preferably the camera incorporates a light source for directly irradiating unmasked areas of a photographic material at the first exposure station. Thus the camera may incorporate a light chamber defined in part by said masking means and the transporting means may serve to transport photographic material along a path adjacent such mask. Means may be provided for ensuring that the photographic material at the first station is in proper contact with the mask at the moment of exposure at such first station. Preferably the light source and light chamber are such as to ensure substantially uniform irradiation of the unmasked areas of the photographic material.

The masking means may be of such nature that it has a vignetting effect on one of the masked areas or on each of the masked areas. Preferably the mask comprises a transparent member with at least two opaque areas corresponding to the spaces reserved for bearing an image. If desired, at least one of such opaque areas may have a boundary shaped or formed to create the vignetting effect.

In a camera designed for loading with a roll of photographic material the camera preferably incorporates means for severing successive lengths of material from the roll. For example such severing means may operate to sever the photographic material at a position between the first and second exposure stations and may e.g. be timed to operate before or after exposure of the areas (which were masked at the first station) at the second exposure station.

The camera may be designed for holding at least one subject in the form of graphic matter, e.g., in the form of a sheet, strip, card or the like bearing letters, numerals or other readable indicia or bearing pictorial matter such as a drawing or photograph of a person. In certain embodiments the camera incorporates such a holder and a light source for reflex-exposing one of the said areas of a photographic material at the second exposure station to matter held in such holder. Where this arrangement is adopted it is not necessary for the optical element or elements provided for focussing an image of that subject onto the photographic material to be associated with a diaphragm or other shutter means. The said subject, when in position in the holder therefor, may form a boundary of a light chamber which is light-tight with respect to ambient light. However the camera may be designed for holding a subject in the form of a transparency in which case shutter means may be required for ensuring proper timing of the exposure of the photographic material through the transparency.

Although the camera can be designed for exposing both of the previously masked areas at the second exposure station, to graphic matter, it is generally at present of principal interest to design the camera so that while one of the said areas can be exposed to a subject in that form the other can be exposed, preferably at the same moment, to a subject, e.g., a person, located at a position spaced forwardly from the camera. Thus the camera may incorporate one or more optical elements for focussing an image of a subject, located forwardly from the camera onto one of the previously masked areas of a photographic material, such element(s) being associated with a diaphragm and/or shutter means. Preferably the camera carries one or more light sources for illuminating a thus forwardly located subject. Such a light source or sources, and the light source or sources (if provided) for illuminating a graphic subject held by the camera, can be synchronised, e.g., may be connected to a common operating circuit under the control of an appropriate diaphragm or shutter-operating switch.

The scope and spirit of the invention will be exemplified with the help of the following description of a preferred embodiment and in the light of following FIGURES in which:

FIG. 1 is a partly sectional view showing the general set-up of a photographic camera according to the invention, FIG. 2 is an isometric view of the masking means, FIG. 3 shows the cross-sectional view of an alternative form of part of the second exposure station, FIG. 4 shows a detail of the cutting mechanism, FIG. 5 is a view of the knife guiding mechanism during cutting, and FIG. 6 shows a set-up of a photographic camera according to the invention during use.

FIG. 1 represents a sectional view of a photographic camera 10 according to the invention for recording at least two images onto one sole support, for example the image of a person and that of data related to said person. It comprises a light-tight housing 11 in order to locate the several parts and systems and a roll 12 of photographic material 13.

The photographic material 13 may be in web or strip form and may be manufactured onto a paper support or onto a film support as well. In the following description it is assumed that the recording material is a roll of negative material suited for processing according to the diffusion transfer reversal process. The advantages related to the treatment of such material will be explained in the course of this description.

The photographic material 13 is conveyed over a roller 14 towards a first exposure station 15. Before exposure, the photographic material 13 is pressed against a mask 16 by means of the movable platform 17 and uniformly exposed with the help of the light source 18 at the unmasked areas. As to the nature of the light source, an incandescent lamp as well as a flash tube may be used. The mask 16 is preferably made of glass on which a number of opaque areas are provided in order to absorb part of the light emitted during exposure. In so doing no latent image is formed on the sensitive layer of the photographic material 13 lying under said areas.

After exposure of the photographic material 13 in this way, it is transferred by means of a roller pair 48a to a second exposure station 19 which comprises two optical systems.

The first system includes the objective 20, the holder 21 for the original, a housing 22 for holding a flash tube 23 and a light-tight housing 24. The focal plane of the objective 20 is formed by the back side of the housing 24 and a first non-exposed area of photographic material 13 is located in that plane.

As the holder 21 bearing the original 25 is only at a small distance from the objective 20, the latter may be of a rather short focal length and with a fixed focus. As the flash tube 23 illuminating the original containing holder 21 is fixedly mounted, the net amount of light striking the original 25 is constant during each exposure, so that there is no need for complicated diaphragm structures in front of or behind the objective 20. If desired, the use of such diaphragm is even unnecessary when an objective having a rather low relative aperture is used. The original may be any written, typewritten or photographic document, capable to be exposed by reflection. In a preferred embodiment (see also FIG. 6) it will have standardized dimensions in order to fit in a slot of adequate shape communicating with the holder 21.

The second optical system, which is intended to record data outside the camera comprises an objective 26, a shutter 27 and a light-tight housing 28, the back of which forms the focal plane of the objective 26. The shutter is provided in order to screen off the light which would otherwise penetrate into the housing 28 during periods that the camera 10 is not in use. In this FIGURE said shutter is diagrammatically represented as being a roller-blind type shutter, although other known types may be used at will. For the same reasons as set forth in connection with the first optical system, in most cases, the use of a diaphragm may be omitted. Although, for the sake of clarity, the optical systems are represented in an exaggerated way, the focal length of objective 26 exceeds the focal length of objective 20, as the data to be recorded (in this case the portrait of a person) are situated at a greater distance from the camera than the data serving as original in the first optical system.

As to the exposure in both optical systems, it will be appreciated that they preferably occur simultaneously although this is not strictly necessary.

Before or after the exposure in the second exposure station a cutting action must occur to sever the part of the photographic paper web 13 containing the recorded data from the rest of the web. This may be done with the help of a circular knife 30 mounted on a rotating disc 31 driven by a motor 32. The knife 30 is constantly urged in a determined direction by means of a spring 33 tending to provide an outermost position to the knife 30 with relation to the disc 31. Upon rotation of the disc 31 (see also FIG. 5) a pair of small rollers 34,35 contact guides 36,37 and exert a compressing action upon spring 33. In so doing the knife 30 is made to temporally follow a linear path, while cutting the web of photographic material 13 which may be forwarded to a developing station.

The rotation of the disc 31 has some other consequence. As may be derived from FIGS. 1 and 4 a cam 38 is provided on the disc 31 on which a small roller 39, supporting a shaft 40 may freely rotate. The shaft 40 carries at its extremities respectively members 41 and 42 supporting the platform 17. As may be seen in FIG. 1 the member 42 is hollow of structure and houses a spring 43 in order to press the platform 17 resiliently against the photographic material 13 and the mask 16.

With the help of microswitches and/or other logic circuitry (not shown) the operations which are to be performed by the camera may be carried out in sequence. So the cutting of the photographic material by the knife 30 may start the exposure of the photographic material in contact with the mask 16; also the energizing of the flash tube 23 and the light sources illuminating the subject to be photographed may be synchronised.

If desired, an image-wise exposed photographic material may be processed in the camera 10 itself. Therefore, a processing station is provided which may be of rather conventional structure. It comprises a developing tank 44 in which a guide plate 45 is provided, the clearance between both members defining a slot 46 through which the photographic material 13 is conveyed. The slot 46 is filled with processing liquid which is supplied by an inverted supply bottle 47. The photographic material 13 is passed through a nip of a pair of transport rollers 48b and the top part of guide 49, is squeezed when leaving the processing station by squeeze-rollers 50 and is conveyed out of the apparatus through the slot formed by guide plates 51, 52.

As already mentioned hereinbefore, the apparatus may be used advantageously for making photographs of at least two images on photographic material according to the silver complex diffusion transfer reversal process. This process makes use of a negative and a positive material. The negative material has a photosensitive layer which may be processed in only one processing solution. The positive material is provided with a so-called nuclei layer, a "nucleus" being a chemical compound onto which silver salts, and in particular silver complexes, may be reduced, to metallic silver. The processing liquid now converts the exposed silver halide of the negative material into silver, whereas the non-exposed silver halides dissolve in the processing liquid in the form of silver complexes. When forming a sandwich between the negative and the positive material whereby the photosensitive layer of the negative is in intimate contact with the nuclei layer of the positive, the silver complexes migrate from the negative to the positive material and are reduced to metallic silver on the nuclei, thus forming a positive image thereon.

The application of the diffusion transfer reversal system for making photographic passports, cheques or identity cards provides a supplementary precaution against falsifications as a quick examination of the positve image will immediately reveal whether the grain structure of the latter is identical over the whole surface of the image or not. If desired, the positive material may bear preprinted matter in the form of complicated coloured patterns for rendering falsifications completely impossible.

The introduction of a sheet of positive material occurs through the slot 53 whereinafter the sheet may be gripped at its side edges by a pair of endless belts 54,55 conveying the sheet via the bottom part of guide 49 in slot 46 of the processing unit in contact with the exposed negative.

The sandwich leaving the camera is separated again by hand or automatically. In the latter case a supplementary station may be provided which automatically destroys the negative.

The processing station of the camera may be adapted in order to treat special kinds of positives, for example positive materials which form part of booklets, such as passports. In that case, care has to be taken to only wet the negative material whereinafter the latter is contacted with the concerning positive and the sandwich so formed is passed through the nip of the squeeze rollers, which have to be resiliently biased with respect to each other in order to accommodate to the thickness of the sandwich.

The camera as described above delivers photographs, the image parts of which having no sharp edges, as the overall exposure of the negative through the mask leaves white areas on the positive after chemical treatment. Moreover, the background before which the subject is seated as well as the support carrying the supplementary data, both being white or at least light-coloured the amount of light striking the negative will be amply sufficient to obtain dense black areas on the latter after processing and subsequently, pure whites on the positive. As a consequence, the edge defining the respective image planes have completely disappeared, so that a substitution of the original image for another one is rendered impossible without a fair chance of detection, even by an unskilled person.

FIG. 2 shows an isometric view of the mask 16. It comprises a support 56 of sufficient dimensional stability, preferably glass. Onto said support are provided at least two areas 57,58 showing a high opacity to light. The areas may both have a pure geometric shape as it is illustrated for the area 57 or may have a shape, the contours of which have a more or less washed-out aspect or contours the photographic density of which gradually decreases or increases towards the edges as it is the case for the area 58. In this way an effect of vignetting may be simulated which renders falsifications of the photograph extremely difficult. For the manufacture of such masks, photographic plates may be used advantageously.

FIG. 3 shows an alternative configuration of the first optical system of the second exposure station. It differs from the one illustrated in FIG. 1, in that it is suited for exposure by transmission. Such exposure is done if the original 25 is not in the form of printed or typewritten matter but in the form of a transparency such as a roll of microfilm, for example. Then, the flash tube 23 is no longer situated at the same side of the original as the objective 20 but at the opposite side thereof. It will be appreciated by those skilled in the art that the camera housing may be adapted for quick and easy switching from exposure by reflection to exposure by transmission.

FIGS. 4 and 5 show details of the cutting mechanism used for severing the exposed strip of recording material from the rest of the web.

In FIG. 4, it can be seen that the mechanism for pretensioning the knife 30 may be subjected to some variations. For example, the tension spring 33 may be constructed so as to exert a constant pushing force upon the rod 54. To this end the spring 33 is enclosed between a piston 55 and part of the disc 31, the piston 55 carrying a rod 54 on which the knife is mounted. At the upper side of the disc 31 is provided a cam 38 carrying a roller 39. As may be seen in FIG. 4 the cam 38 gradually slopes down with respect to the disc 31 in order to provide for an intimate contact between the platform, the recording material and the mask upon rotation of the disc 31.

The circular knife 30 (see FIG. 5) is carried by the rod 54 which bears at its extremity a U-shaped member 56, between the legs of which the knife 30 is fitted, carried by a shaft 57. On the extremities of the shaft 57 are provided rollers 34 and 35 which serve to impart a linear motion to the knife 30 during the cutting cycle of the web 13 by rolling over the guides 36 and 37, which run in parallel relation with respect to the transverse direction of said web. The rollers 34 and 35 may be small ball-bearings which provide for a minimum of friction so that the motor 32 (see FIG. 1) for driving the disc 31 may be small sized.

FIG. 6 shows the camera according to the invention in operation wherein it is assumed that the portrait of a subject, e.g. a person 70 has to be combined with data recorded on card 25. The photograph of the subject is taken with the help of objective 26 (see also FIG. 1). The camera is equipped with flash tubes 59, 60 illuminating the subject during exposure whereby the flash tubes are preferably synchronized with the flash bulb 23 (see FIG. 1) illuminating the data.

Apart from these lighting devices, the camera 10 is equipped with a simple telemetering system to define the correct distance at which the person 70 is to be positioned in front of the camera.

The telemetering system is in the form of two lamps 61 and 62 each of which is capable to project a V-shaped light pattern on the forehead of the person 70. As the light rays follow a path converging towards the person 70 at a determined distance, both light patterns meet each other at a given distance from objective 26 on the forehead of the person 70 which may control the event by looking into the mirror 58. When the V-shaped light patterns touch each other to form an X, the person 70 is at the distance assuring a correct focus and the photograph can be taken. At that moment the lamps 61 and 62 are de-energized and the flash lamps 59 and 60 together with the one working in combination with the first optical system are ignited. When using diffusion transfer materials, a sheet of positive paper is then fed through the opening 53 and after a few seconds a positive image is obtained.

Although neither represented in the FIGURES, nor explicitly disclosed in the foregoing description, it will be appreciated by those skilled in the art that the camera according to the invention may be completed with supplementary logic in order to increase the ergonomic properties of the camera and to provide for the possibility of complete control of the good functioning and the general condition of the apparatus.

We claim :

1. A photographic camera for exposing a photographic light-sensitive material simultaneously to different subjects to form images thereof at different locations on such material, which camera comprises a storage station containing a roll of photographic material, at least two exposure stations arranged in succession, one of said stations incorporating masking means adapted to shield at least two areas of the material while the remainder thereof is being exposed to light at that station, the other station having optical projecting means for projecting an image of one subject onto one of said initially shielded areas and an image of at least one other subject onto another of such areas of the photographic material, transport means for delivering predetermined lengths of photographic material from said roll to said exposure stations, severing means actuatable to sever said predetermined lengths of photographic material and web engaging means upstream of said severing means intermittently operable to immobilize the photographic material during the actuation of said severing means.

2. A photographic camera according to claim 1, wherein said first exposure station comprises a light-tight chamber housing a source of light for exposing unmasked areas of a photographic material at said first station.

3. A photographic camera according to claim 1, wherein said masking means is such as to have a vignetting effect on at least one of the masked areas.

4. A photographic camera according to claim 1, wherein said photographic material is in roll form and said transporting means serves to transport successive lengths of photographic material from a said roll and successively through said first and second exposure stations.

5. A photographic camera according to claim 1, and including a holder for holding at least one subject in the form of graphic matter in a position for projection of an image thereof onto a said area of a photographic material at said second exposure station.

6. A photographic camera according to claim 5 including at least one source of light for reflex-exposing a said area of a photographic material to a subject in the form of graphic matter when present in said holder.

7. A photographic camera according to claim 1, and incorporating at least one light source for illuminating a subject located at a position spaced forwardly from the camera during projection of an image of such subject onto a said area of a photographic material at said second exposure station.

8. A photographic camera according to claim 7, wherein said light source for reflex exposing said area of a photographic material, and said light source for illuminating a subject located at a position spaced forwardly from the camera, are connected into an operating circuit for simultaneously operating such sources.

9. A photographic camera according to claim 1, which has a built-in processing station in order to process the exposed recording material.

10. A photographic camera according to claim 1 used with a photographic recording material which is a negative diffusion transfer material.

11. A photographic apparatus according to claim 10 in which means is provided for introducing a sheet of positive diffusion transfer material in order to contact the active layer of the latter with the recording layer of the said negative diffusion transfer material in order to form a sandwich to be developed.

12. A photographic camera according to claim 11 which is provided with a slot for guiding the processed recording material out of the apparatus.

13. A photographic camera according to claim 1, in which a telemetering system is provided working in combination with one optical system of the second exposure station.

14. The camera of claim 1 wherein said web engaging means comprises means for bringing said photographic material into intimate contact with said masking means at said one exposure station.

* * * * *